Sept. 20, 1955     G. J. HENRY     2,718,373

VALVE CONSTRUCTION

Filed April 25, 1951

INVENTOR.

Guy J. Henry

BY Cromwell, Greist & Warden

Attys.

United States Patent Office 2,718,373
Patented Sept. 20, 1955

2,718,373

VALVE CONSTRUCTION

Guy J. Henry, Arlington Heights, Ill.

Application April 25, 1951, Serial No. 222,823

6 Claims. (Cl. 251—357)

The present invention relates to improvements in the construction of valves of the type characterized by a compressible, preferably resilient sealing ring, washer or member mounted on a rigid valve head, disk, plunger or the like and adapted to engage a coacting shaped, rigid annular sealing seat surface.

Valve constructions of the above general type have been embodied in different forms for use in many different special valve classifications, such as shut-off valves, make and break couplings, etc. For instance, it has been proposed to employ a pre-shaped resilient O-ring, as well as variations of a true O cross sectional outline, in which the ring is slipped into an annular groove turned on the valve member or disk. This type is often inefficient to the point of inopeartiveness for the reason that pressure acting on the seat disk tends to pull the resilient ring out of its groove, rendering it wholly or partially useless. In accordance with another procedure, the compressible ring is molded directly into a groove on a valve head or disk. However, in this type it has been found difficult to properly center the ring in actual production, with the result that when installed, non-uniform compression of the ring exists. Non-uniformity of sealing and inevitable leakage under severe pressures and other exacting operating conditions results.

It is therefore an object of the invention to provide a valve seat construction which overcomes the foregoing drawbacks, in the form of a valve head or disk provided with a resilient, compressible sealing ring which is positively anchored to the disk in an improved manner, so as to be truly concentric with the disk and to produce a reliable controlled squeeze of the latter when compressed against a coacting sealing surface in the body of the valve.

More specifically, it is an object of the invention to provide a valve member characterized by an axially movable head or disk, by an accurately pre-molded, annular grommet-like sealing element or washer associated with the disk in an improved, axially telescoped and truly concentric relation thereto, and by improved securing means which coacts with the disk and element in uniformly centering the latter on the disk with reference to a valve seat against which the disk is axially movable.

Yet another object of the invention is to provide a valve construction, particularly of the swivel head type, being characterized by a hollow valve body and a valve stem which is movable axially in said body to and from a sealing surface therein by means of a threaded connection between the stem and body, said stem having a valve member or disk coaxially and rotatably swiveled thereon, in which construction the disk is equipped with an improved and specially shaped, pre-molded resilient sealing washer or element in accordance with the preceding paragraphs, to the end that the element may engage and effect a uniform sealing action with an annular valve body seat upon initial contact therewith, thereafter maintaining non-rotative sealing engagement with the seat due to the swivel connection, notwithstanding the rotative threading operation of the stem to further increase compression of the sealing washer or element.

The foregoing statements are indicative in a general way of the nature of the invention. Other and more specific objects will be apparent to those skilled in the art upon a full understanding of the construction and operation of the device.

A single embodiment of the invention is presented herein for purpose of illustration. It will be appreciated that the invention may be incorporated in other modified forms coming equally within the scope of the appended claims.

Figure 1:
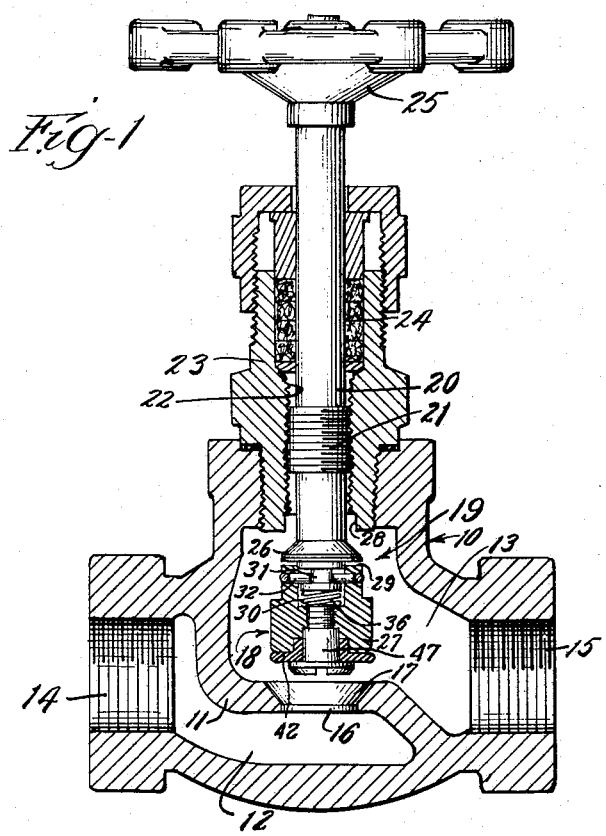
Fig. 1 is a view in vertical longitudinal section through an improved swivel valve featuring the improved resilient washer of the invention, the valve parts being shown in open condition.

Referring to Fig. 1 of the drawings, the reference numeral 10 generally designates a hollow valve body of well known type, characterized by a transverse internal partition or wall 11 dividing the interior of the body into an intake space 12 and a discharge space 13. These spaces directly communicate with the intake fitting 14 and discharge fitting 15, respectively. The partition 11 is provided with a vertically opening port 16 shaped at its upper portion to provide a conical downwardly tapered annular sealing surface or seat 17.

The improved valve head of the invention is generally designated 18. It is operatively connected by means of swivel joint, generally designated 10, to a rotatable stem 20. This stem is provided with integral thread 21 which engages the internal, axially elongated tapped throat 22 of a bonnet 23 secured to housing 10, the stem being suitably packed at 24 to prevent axial leak. The stem terminates externally of the valve bonnet in an operating hand wheel 25.

The construction of the valve disk or head is, in general respects, similar to that illustrated and described in my Patent No. 2,470,700, dated May 17, 1949, but it embodies improved provisions whereby when a resilient sealing element thereof, hereinafter described in detail, engages the tapered sealing surface 17, any tendency to twist and displace the resilient element from the disk is combatted in improved manner by the swivel connection 19, coupled with structural features of the resilient element and its mounting.

For the foregoing purposes the valve stem 20 is provided with an enlarged annular shoulder 26 immediately above the main body portion 27 of the seat disk 18. This shoulder is tapered for the purpose of back seating against the lower annular edge 28 of the bonnet in which it is threadedly received. The stem has a flat, horizontal lower rim surface which is adapted for thrust engagement with the upper surface 29 of the disk 27 when the latter is to be thrust into sealing relation to the sealing surface 17.

Figure 3:
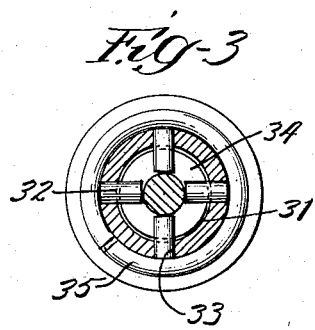
Fig. 3 is a view in horizontal transverse section on line 3—3 of Fig. 2, further illustrating certain swiveling provisions whereby the valve head or disk is rotatable with reference to the valve stem.
Figure 4:
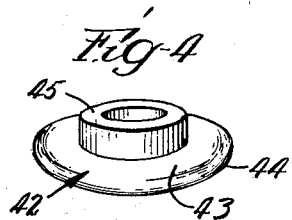
Fig. 4 is a perspective view illustrating the improved, grommet-like resilient sealing element which is a component of the improved construction.

An axial recess 30 is formed in surface 29, providing a chamber which loosely receives the annularly grooved integral lower extension 31 of valve stem 20. A plurality of radial pins 32 (see Fig. 3) extend loosely through radial holes 33 in the upper portion of disk 27 which surrounds axial recess 30, and these pins are received in the annular groove 34 of the stem extension 31. A split ring 35 is mounted in an external annular groove about the disk, as shown in Fig. 3, to prevent accidental outward movement of the pins 32. A coil compression spring 36 acts between the lower end of stem extension 31 and the bottom of recess 30, normally urging the stem away from disk 27; hence the stem extension 31 abuts upwardly against the pins 32, in the relation illustrated in Fig. 1. Spring 36 is compressed when the valve is closed, enabling the shoulder 26 to approach and engage the upper surface 29 of the disk and thus to exert final non-rotative closing thrust on the latter upon rotative actuation of the stem 20.

The disk 27 is provided with an axial counterbore 38 in its lower surface 39 which is concentric with an axial bore 40 in the disk. This bore 40 includes a threaded portion 41 extending through to the chamber recess 30, in which the stem extension 31 and coil spring 36 are disposed.

Figure 2:
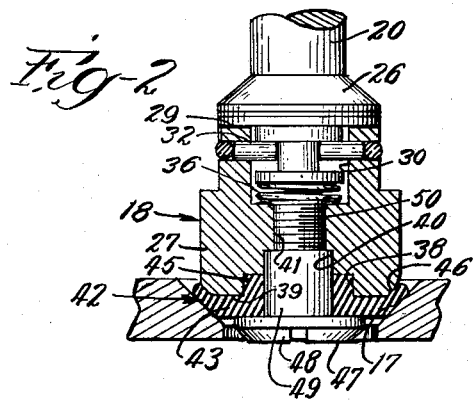
Fig. 2 is a fragmentary view in section similar to that of Fig. 1, though somewhat larger scale, showing the valve stem, disk and associated sealing element in a closed condition of the valve.

An annular, grommet-like sealing washer, ring or element, generally designated 42, of resilient material such as rubber, neoprene or the like is associated with disk 27 for the purpose of sealing against valve surface 17. Element 42 is characterized by a radially extending lower flange 43, preferably of rounded cross section at its outer periphery 44. It has an axially extending cylindrical sleeve portion 45 which is accurately molded so that its outer surface fits snugly in the counterbore 38 of disk 27. Furthermore, the disk itself is beveled about its lower outer edge, as indicated at 46 in Fig. 2, thereby accommodating the rounded edge periphery of the flange 42 when the element is compressed, as in Fig. 2.

The disk construction 18 is completed by a securing screw 47. Screw 47 has an enlarged washer securing head 48 which abuttingly engages against the lower surface of the resilient ring flange 42, a relatively thick cylindrical body portion 49 which fits accurately and snugly into the axial bore of the element 42, and a threaded rear portion received in bore portion 41 of disk 27.

Head 47 is of a diameter greater than that of the counterbore 38 of disk 27 so as to insure the washer is pressed against the lower face 39 outwardly of the counterbore area. The securing head is also beveled at its lower edge, the taper of the bevel being approximately the same as that of disk bevel 46 and the surfaces of the two bevels being in approximate alignment.

In assembling the disk the resilient washer or ring element 42 is mounted on disk 27 by telescoping its sleeve portion 45 snugly into the disk counterbore 38. Screw 47, over the body of which the seat element may first be mounted as an alternative sequence, is then applied to the disk and threaded into place compressing flange 43 against the lower surface 39 of the disk and forcing the sleeve portion 45 well into the counterbore 38. When this is done, the upper extremity of the stem 50 is peened over, securely and permanently holding the disk components against separation.

The nested, snugly interfitting relationship of the resilient seat element 42 in the disk body 27 and the positive axial gripping exerted on the element by the securing screw 47 insure against displacement of the resilient piece from its accurately assembled relation to the valve stem, notwithstanding the application of heavy fluid force or a high velocity of flow through port 16. When thrust downwardly upon rotation of stem 20, the ring or element 42 and disk 27 cease rotation immediately upon initial contact with sealing surface 17. They retain this fixed engagement as the stem 20 continues to descend relative to the disk, compressing spring 36.

When the enlarged shoulder 26 of stem 20 engages the upper surface 29 of the disk the latter is thrust positively into final sealing relation, causing seat element 42 to engage the surface 17 over a relatively wide annular area and to curl upwardly about the bevel 46 of the disk. Similarly, upon reverse stem rotation the sealing element maintains fixed engagement with the sealing surface until the stem has fully separated relative to the disk, whereupon the stem extension 31 engages the swivel pins 32 to lift the disk away from the surface.

It is seen from the above that the special improved mounting of the resilient ring 42 is a great improvement over direct molded or prior O-ring constructions in its reliability and uniformity of sealing. It also has maximum resistance to dislodgement under mechanical or fluid twisting or tensile forces, and the particular swivel disk installation in which the element 42 is associated contributes to the effectiveness of the last named attribute by minimizing torsional stress thereon.

I claim:

1. A valve construction comprising, a rigid valve head having an axial bore and a counterbored recess of larger diameter concentric with said bore, to which one end of the bore opens, a washer securing member having a radially outwardly flanged head portion of substantial diameter exceeding that of said counterbore, and a cylindrical body portion of lesser diameter than said counterbored recess and concentrically adjoining said flanged head portion, an annular grommet-like sealing washer of resiliently compressible material fitted to and between said valve head and securing member, said washer comprising a radial flange compressed between said head and said flanged head portion and an integral axially extending sleeve concentric with said flange, said sleeve being snugly telescoped onto the body portion of said securing member and slidingly nested into the counterbored recess of said valve head, said washer flange being radially outwardly exposed beyond the flanged head portion of said securing member for engagement under compression with a valve seat, and means to hold said securing member on said valve head.

2. In a valve construction, a rigid valve head having an axial bore and a counterbored recess of larger diameter concentric with said bore, to which one end of the bore opens, a washer securing member having a radially outwardly flanged head portion of substantial diameter exceeding that of said counterbored recess, a cylindrical body portion of lesser diameter concentrically and integrally adjoining said flanged head portion, and an axially extending securing portion of still lesser diameter concentrically and integrally adjoining said body portion, and an annular grommet-like sealing washer of resiliently compressible material fitted to and between said valve head and securing member, said washer comprising a radial flange compressed between said head and said flanged head portion and an integral axially extending sleeve concentric with said flange, said sleeve being snugly telescoped onto the body portion of said securing member and slidingly nested into the counterbored recess of said valve head, said washer flange being radially outwardly exposed beyond the flanged head portion of said securing member for engagement under axial compression with a valve seat.

3. A valve construction in accordance with claim 1 in which said valve head has an axially facing surface surrounding said counterbore which is beveled, said sealing washer flange extending somewhat outwardly beyond said beveled surface when not under compression.

4. A valve construction in accordance with claim 1 in which said valve head has an axially facing surface surrounding said counterbore which is beveled, said sealing washer flange extending somewhat outwardly beyond said beveled surface when not under compression, said flanged head portion of said securing member having a corresponding, axially facing surface which is also externally beveled, said beveled surfaces being in substantial alignment and being of substantially the same degree of taper.

5. A valve construction in accordance with claim 1, in which said flanged head portion and said cylindrical body portion of said washer securing member are integral with one another.

6. A valve construction in accordance with claim 2, in which said flanged head portion and said cylindrical body portion of said washer securing member are integral with one another.

References Cited in the file of this patent

UNITED STATES PATENTS

| Number | Name | Date |
|---|---|---|
| 568,405 | Hills | Sept. 29, 1896 |
| 1,846,623 | Volk | Feb. 23, 1932 |
| 2,088,666 | Portl | Aug. 3, 1937 |
| 2,281,689 | Hare | May 5, 1942 |
| 2,300,815 | Sharp | Nov. 3, 1942 |
| 2,470,700 | Henry | Mar. 17, 1945 |
| 2,525,796 | Harding | Oct. 17, 1950 |
| 2,569,471 | Harding | Oct. 2, 1951 |